(12) United States Patent
Shepertycky et al.

(10) Patent No.: US 9,407,125 B2
(45) Date of Patent: Aug. 2, 2016

(54) BIOMECHANICAL ELECTRICAL POWER GENERATION APPARATUS

(71) Applicant: Queen's University at Kingston, Kingston (CA)

(72) Inventors: Michael Y. Shepertycky, Picton (CA); Qingguo Li, Kingston (CA); Yan-Fei Liu, Kingston (CA)

(73) Assignee: Queen's University at Kingston, Kingston (CA)

(*) Notice: Subject to any disclaimer, the term of this patent is extended or adjusted under 35 U.S.C. 154(b) by 133 days.

(21) Appl. No.: 14/309,395

(22) Filed: Jun. 19, 2014

(65) Prior Publication Data

US 2015/0001853 A1    Jan. 1, 2015

Related U.S. Application Data

(60) Provisional application No. 61/837,800, filed on Jun. 21, 2013.

(51) Int. Cl.
*H02K 7/18* (2006.01)
*A45F 3/04* (2006.01)
(Continued)

(52) U.S. Cl.
CPC ............ *H02K 7/1861* (2013.01); *A45F 3/04* (2013.01); *F03G 5/08* (2013.01); *H02K 7/1853* (2013.01); *A45F 2003/003* (2013.01); *H02P 9/48* (2013.01)

(58) Field of Classification Search
CPC ........ H02K 7/1853; H02K 35/02; F03G 1/00; F03G 1/02; F03G 7/08; F03G 3/00; F03G 5/00; A47J 29/04

USPC .............. 290/1 E, 1 R; 185/27, 29, 32, 33
See application file for complete search history.

(56) References Cited

U.S. PATENT DOCUMENTS 4,872,665 A * 10/1989 Chareire ............... A61H 1/0237
    482/51
4,967,734 A * 11/1990 Rennex ................. A43B 13/182
    482/51

(Continued)

FOREIGN PATENT DOCUMENTS

WO    WO 99/05991 A2    2/1999

OTHER PUBLICATIONS

Li, Q. et al., "Biomechanical Energy Harvesting: Apparatus and Method", IEEE International Conference on Robotics and Automation, pp. 3672-3677, May 19-23, 2008.

(Continued)

*Primary Examiner* — Tulsidas C Patel
*Assistant Examiner* — Charles Reid, Jr.
(74) *Attorney, Agent, or Firm* — Stephen J. Scribner

(57) ABSTRACT

An apparatus and method for generating electrical power from a user comprises a motion capture apparatus that captures at least a portion of motion of a pair of limbs of the user; a motion integrator mechanically coupled to the motion capture apparatus such that captured motion of the pair of limbs is transferred to the motion integrator, and the motion integrator produces an output motion; an adaptive controller, and an electrical generator mechanically coupled to the output motion of the motion integrator; wherein the electrical generator generates electrical power from the output motion of the motion integrator. The apparatus may be adapted to be carried on the user's back. In one embodiment the apparatus is incorporated into a backpack.

23 Claims, 14 Drawing Sheets

(51) Int. Cl.
*F03G 5/08* (2006.01)
*A45F 3/00* (2006.01)
*H02P 9/48* (2006.01)

(56) References Cited

U.S. PATENT DOCUMENTS

| | | | | |
|---|---|---|---|---|
| 6,024,713 | A * | 2/2000 | Barney | A61F 5/0125 602/16 |
| 6,666,796 | B1 * | 12/2003 | MacCready, Jr. | A61F 5/0102 135/65 |
| 6,966,882 | B2 * | 11/2005 | Horst | A61H 1/0237 601/33 |
| 6,982,497 | B2 | 1/2006 | Rome | |
| 7,391,123 | B2 | 6/2008 | Rome | |
| 7,645,246 | B2 | 1/2010 | Rastegar et al. | |
| 7,652,386 | B2 | 1/2010 | Donelan et al. | |
| 7,989,971 | B2 | 8/2011 | Lemieux | |
| 8,217,523 | B2 | 7/2012 | Brown et al. | |
| 8,299,634 | B2 | 10/2012 | Donelan et al. | |
| 2002/0094919 | A1 * | 7/2002 | Rennex | A61F 5/0102 482/124 |
| 2005/0262725 | A1 * | 12/2005 | Rennex | A43B 13/14 36/7.8 |
| 2008/0278028 | A1 | 11/2008 | Donelan et al. | |
| 2010/0160122 | A1 | 6/2010 | Rastegar et al. | |
| 2010/0229825 | A1 | 9/2010 | Parsons | |
| 2010/0253088 | A1 | 10/2010 | Weinberger et al. | |
| 2011/0278857 | A1 | 11/2011 | Sugar et al. | |

OTHER PUBLICATIONS

Li, Q. et al., "Development of a biomechanical energy harvester", Journal of NeuroEngineering and Rehabilitaion, 6: 22, pp. 1-12 (2009).

Rome, L.C., et al., "Generating Electricity While Walking with Loads", Science, vol. 309, pp. 1725-1728, (2005).

Shepertycky, M. et al., "Development of an Energy Harvesting Backpack and Performance Evaluation", IEEE International Conference on Rehabilitation Robotics, Jun. 24-26, 2013.

Zhang, J-T., et al., "Lower-Limb-Driven Energy Harvesting: Preliminary Analysis", 33rd Annual International Conference of the IEEE EMBS, pp. 4511-4514, (2011).

The Walking Charger; Tech Briefs Design contest 2012, pp. 1-2, Jun. 2011.

Shepertycky, M. et al., "Biomechanical Energy Harvesting Backpack", Ontario Biomechanics Conference, 2012 (Abstract only).

Brockway, J.M., "Derivation of Fomulae used to Calculate Energy Expenditure in Man", Human Nutrition: Clinical Nutrition (1987), 41C, 463-471.

* cited by examiner

BIOMECHANICAL ELECTRICAL POWER GENERATION APPARATUS

RELATED APPLICATION

This application claims the benefit of the filing date of U.S. Provisional Application No. 61/837,800, filed on Jun. 21, 2013, the contents of which are incorporated herein by reference in their entirety.

FIELD

This invention relates to the field of electrical power generation from human or animal movement. More particularly, this invention provides a biomechanical electrical generation apparatus that is driven by movement of a pair of limbs of a human or animal user.

BACKGROUND

Recent advances in the field of biomechanical energy harvesting have led to the development of devices that are capable of capturing mechanical energy produced by human motion and converting that energy to electricity. Existing devices can be grouped into three categories based on the principle used in the energy conversion: (a) Inertia-based, which use inertia force of a proof mass as the input for power generation; (b) Impact force-based, which use the impact force of a moving mass to drive a generator; and (c) Motion-based, which directly harness limb motion and use it to drive a generator.

An inertia-based system that generated a relatively large amount of power was a suspended-load backpack which captured the up-and-down movement of the carried load during walking to drive a rotary-magnetic generator (Rome, L., et al., "Generating electricity while walking with loads," *Science*, 309:1725-1728, 2005). This system produced approximately 7.4 W of electrical power from a 38 Kg load during fast walking and approximately 0.5 W of electrical power at more modest loads and speeds. However, a drawback of this system was the requirement for the user to carry a substantial load to generate a modest amount of power. Furthermore, the system's up-and-down oscillating mass may disrupt the user's gait pattern and walking stability.

Impact-force-based systems have primarily focused on exploiting the heel impact during walking and attempt to capture the energy that is normally dissipated. For example, such systems harvest energy from the compression of the shoe sole as the leading leg accepts the body weight during walking. Designs have been proposed based on a magnetic rotary generator-based energy harvesting shoe and a dielectric electroactive polymer shoe. However, these systems were capable of generating only small amounts of electrical power: 250 mW and 800 mW, respectively.

Motion-based systems exploit muscle action as the origin of the mechanical work for human movement, and directly capture mechanical energy from joint motion during walking. For example, a knee-mounted energy harvester with a brushless DC rotary magnetic generator was proposed by Li, Q., et al., "Biomechanical energy harvesting: Apparatus and method," in *IEEE International conference on Robotics and Automation*, 2008, pp. 3672-3677; and "Development of a biomechanical energy harvester," *Journal of Neuroengineering and Rehabilitation*, 6:22, 2009. This system was mounted on a user's leg and harvested energy from the leg deceleration in each gait cycle with a control system turning on/off the power generation, based on an approach similar to regenerative braking used in hybrid cars. A pair of harvesters (one mounted on each of a user's legs) generated a total of 5 W of electrical power during walking at a speed of 1.5 m/s. In this mode, 1 W of metabolic power was required from the user to produce 1 W of electrical power. However, a drawback of this system is the mass added to the knee. Because the metabolic cost of carrying a given mass distally is considerably greater than that of carrying it proximally, walking while wearing such a system without power generation requires 20% more metabolic energy expenditure than walking without the device. Additionally, mounting the system to the side of the knee could potentially hinder normal movement and agility, and cause discomfort to the user.

SUMMARY

Provided herein is an apparatus for generating electrical power from a user's limb motion, comprising; a motion capture apparatus that captures at least a portion of motion of a pair of limbs of the user; a motion integrator mechanically coupled to the motion capture apparatus such that captured motion of the pair of limbs is transferred to the motion integrator, and the motion integrator produces an output motion; and an electrical generator mechanically coupled to the output motion of the motion integrator; wherein the electrical generator generates electrical power from the output motion of the motion integrator.

Also provided herein is an apparatus for generating electrical power from a user's limb motion, comprising; a motion capture apparatus that captures at least a portion of the motion of a pair of limbs of the user; a motion integrator mechanically coupled to the motion capture apparatus, such that captured motion of the pair of limbs is transferred to the motion integrator and the motion integrator produces an output motion; an electrical generator mechanically coupled to the output motion of the motion integrator; and a controller that varies an electrical load of the electrical generator according to the motion of the user's limbs; wherein the electrical generator generates electrical power from the output motion of the motion integrator.

In one embodiment, the above apparatus may further comprise one or more sensors that sense the motion of the user's limbs and/or an input force on the motion capture apparatus, and output one or more corresponding sensor signals; wherein the controller varies the electrical load of the electrical generator according to the one or more sensor signals.

In another embodiment, the controller may vary the electrical load of the electrical generator according to a model that is used to determine different periods of a power generation cycle of the user's limb motion.

The motion capture apparatus may comprise: (i) a first anchor that is removably attachable to a first limb of the user; a first actuator that converts motion of the first limb to a first rotational motion; and a first link connected between the first anchor and the first actuator that transfers motion of the first limb to the first actuator; and (ii) a second anchor that is removably attachable to a second limb of the user; a second actuator that converts motion of the second limb to a second rotational motion; and a second link connected between the second anchor and the second actuator that transfers motion of the second limb to the second actuator.

The first link and the second link may each comprise a cable, a brace, or a rod, or a combination thereof. In one embodiment the first link and the second link each comprise a cable and a take-up spring. In another embodiment the first actuator and the second actuator each comprise a pulley and a one-way clutch.

The motion integrator may comprise: a first input for receiving rotational motion of the first actuator; a second input for receiving rotational motion of the second actuator; and an output that provides the output motion; wherein the output motion is rotational motion.

The apparatus may comprise one or more electrical components electrically coupled to an electrical output of the generator, for one or more of receiving, conditioning, and distributing the electrical power.

The motion of the first limb and the motion of the second limb may be substantially reciprocal. The first and second limbs may be legs of a user. The user may be a human being.

At least a portion of the apparatus may be adapted to fit to the user's torso, such as on the user's back. At least a portion of the apparatus may be adapted to fit into a backpack. In one embodiment, apparatus comprises a backpack.

Also provided herein is a method for generating electrical power from a user's limb motion. In one embodiment, the method comprises: disposing a motion capture apparatus on the user such that at least a portion of motion of a pair of limbs of the user is captured; mechanically coupling a motion integrator to the motion capture apparatus such that captured motion of the pair of limbs is transferred to the motion integrator, and the motion integrator produces an output motion; and mechanically coupling an electrical generator to the output motion of the motion integrator; wherein the electrical generator generates electrical power from the output motion of the motion integrator.

In another embodiment, the method comprises: disposing a motion capture apparatus on the user such that at least a portion of the motion of a pair of limbs of the user is captured; mechanically coupling a motion integrator to the motion capture apparatus such that captured motion of the pair of limbs is transferred to the motion integrator, and the motion integrator produces an output motion; mechanically coupling an electrical generator to the output motion of the motion integrator; and varying an electrical load of the electrical generator according to the motion of the user's limbs; wherein the electrical generator generates electrical power from the output motion of the motion integrator.

The above embodiment may further comprise sensing the motion of the user's limbs and/or an input force on the motion capture apparatus; and varying the electrical load of the electrical generator according to the sensed motion of the user's limbs and/or input force on the motion capture apparatus.

The above embodiment may further comprise varying the electrical load of the electrical generator according to a model that is used to determine different periods of a power generation cycle of the user's limb motion.

The method may comprise providing a motion capture apparatus that includes: (i) a first anchor that is removably attachable to a first limb of the user; a first actuator that converts motion of the first limb to first rotational motion; and a first link connected between the first anchor and the first actuator that transfers motion of the first limb to the first actuator; and (ii) a second anchor that is removably attachable to a second limb of the user; a second actuator that converts motion of the first limb to second rotational motion; and a second link connected between the second anchor and the second actuator that transfers motion of the second limb to the second actuator.

The method may comprise using a motion integrator that: receives captured motion of the first limb; receives captured motion of the second limb; and outputs motion derived from a combination of the captured motions of the first and second limbs. In one embodiment, the method comprises outputting rotational motion.

The method may further comprise electrically coupling one or more electrical components to an electrical output of the generator, for one or more of receiving, conditioning, and distributing the electrical power.

In one embodiment the method comprises capturing motion of legs of a user. The user may be a human being. The method may further comprise adapting mechanical and electrical components to be carried on the user's torso. The method may further comprise adapting mechanical and electrical components to be carried in a backpack.

BRIEF DESCRIPTION OF THE DRAWINGS

For a better understanding of the invention, and to show more clearly how it may be carried into effect, embodiments of the invention are described below, by way of example, with reference to the drawings, wherein:

FIG. 5A is a plot of input angular velocity to the generator; FIG. 5B is a plot of angular acceleration; FIG. 5C is a plot of measured and predicted generator output current; and FIG. 5D is a plot of measured and predicted input cable force, wherein the total predicted cable force is a sum of the force for power generation and the force for driving the inertia;

FIG. 6A is a plot of measured input cable length changes during one gait cycle; FIG. 6B is a plot of computed input cable velocity; FIG. 6C is a plot of measured force on the input cable; and FIG. 6D is a plot of measured mechanical power and electrical power; wherein the plots are aligned with drawings of representative phases of the gait cycle (top);

DETAILED DESCRIPTION OF EMBODIMENTS

Figure 1A:
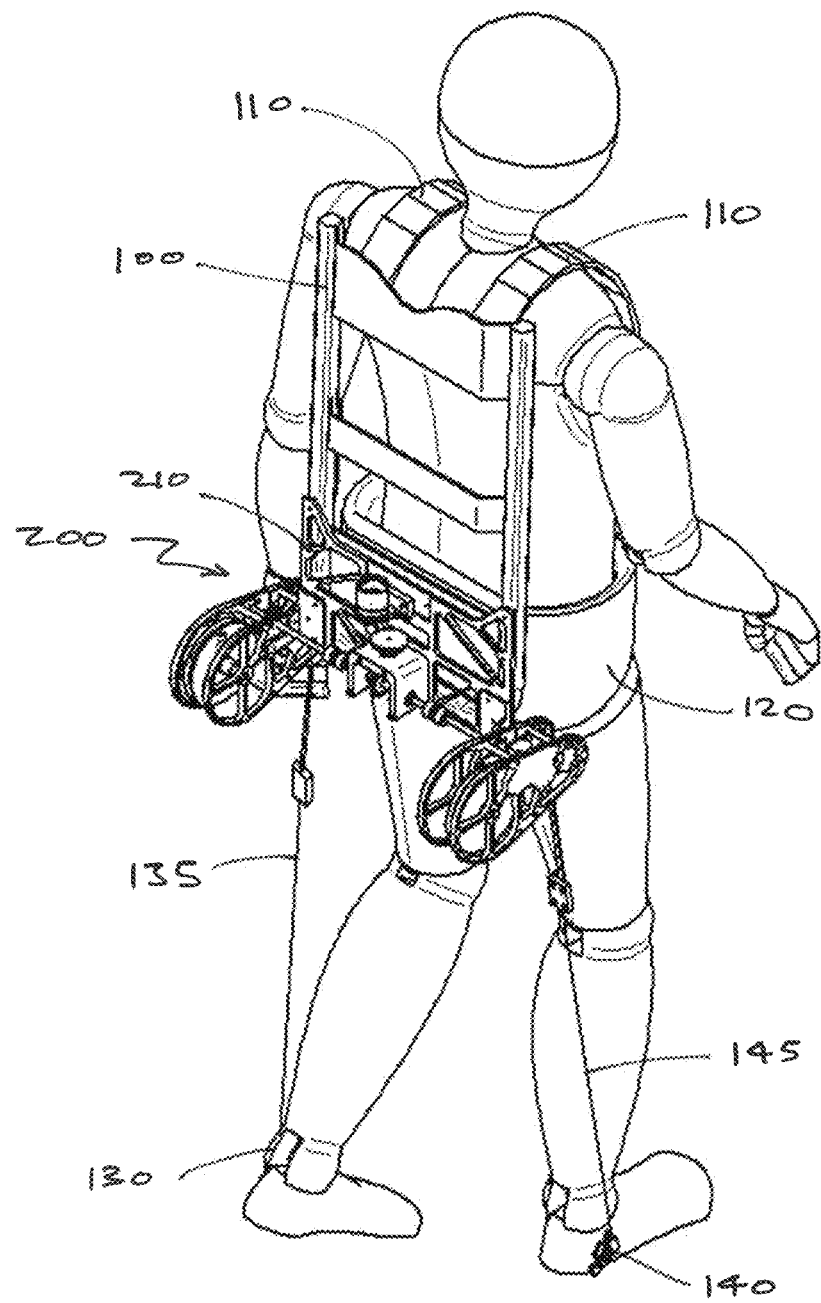
FIG. 1A is a schematic diagram of a biomechanical electrical generation apparatus configured to be worn on a user's back, according to one embodiment.
Figure 1B:
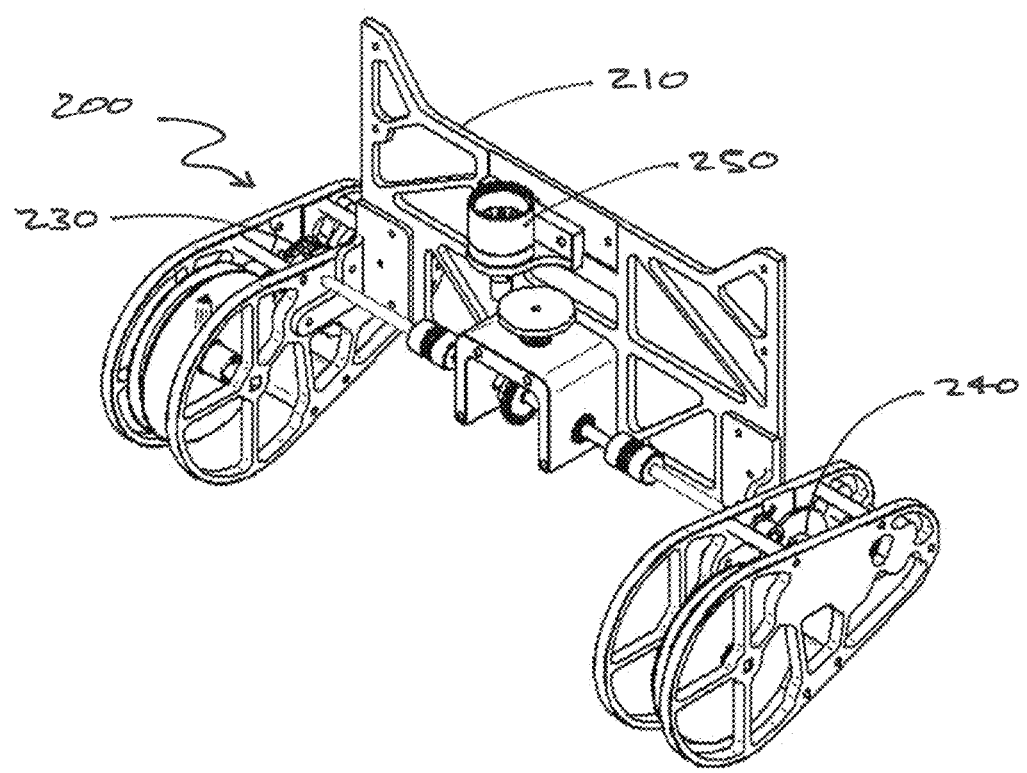
FIG. 1B is an enlarged view of mechanical and electrical components of the embodiment of FIG. 1A.

Described herein is a biomechanical electrical power generation apparatus that captures energy from motion of a pair of limbs of a user, and uses that energy to generate electrical power. Embodiments of the apparatus are adapted to be carried as close as possible to the user's center of mass, i.e., close to or on the user's torso. Thus, most of the mass of the apparatus, associated with electrical and mechanical components, is carried proximally, which requires significantly less energy expenditure by the user relative to carrying the mass distally.

In one embodiment, the apparatus is adapted to be carried on the user's back. For example, the apparatus may be configured as a backpack or a "fannypack", or as a module for use or integration with a backpack or fannypack. Other embodiments may be configured to be worn elsewhere on the user's torso, such as, for example, on the shoulders. The specific configuration may be related to a specific activity being performed by the user while wearing the apparatus.

During locomotion, for example, during walking in humans, there is a relative cyclic movement between each leg/foot and the trunk, i.e., coordinated reciprocal movements of the legs, which may be referred to as a gait cycle (see the drawings at the top of FIGS. 6A-6D). The gait cycle has two phases: the swing phase, in which a foot is not contacting the substrate, and the leg/foot is swinging forward from the rearmost position to the foremost position; and the stance phase, in which the foot is contacting the substrate and is substantially stationary. Embodiments based on motion of a pair of limbs during bipedal locomotion capture at least a portion of the motion of the swing phase of each limb. Thus, for example, in the case of the legs of a walking user, the movements of the two legs and feet are out of phase from each other. These leg and/or foot movements are at least partially captured by the apparatus, and integrated to produce a single unidirectional motion, which is used to generate electrical power.

Embodiments are described herein primarily with respect to use with a bipedal user (e.g., human being) during bipedal locomotion, wherein the links are attached to the user's legs or feet. However, other configurations are contemplated, such as for use with the arms or hands. Various configurations may be suitable for use during specific activities, or may be developed for fitness, amusement, or gaming applications. Further, whereas embodiments are described herein primarily with respect to use with humans, it will be appreciated that embodiments may be configured for use with non-human users, such as, but not limited to, other primates, other mammals, and birds. For example, one or more apparatus may be configured to be attached to one pair of limbs or both pairs of limbs of a quadrapedic mammal, such as an elephant, a cow, or a horse.

Regardless of the specific configuration, the apparatus captures the changing linear displacement between the apparatus and the user's pair of limbs during activity such as walking. The apparatus employs a pair of linking members to transfer motion (i.e., energy) of the limbs to mechanical components of the apparatus. Generally, each such "link" has one end attachable to a users' limb and another end coupled to mechanical components of the apparatus. Each link may comprise, for example, a cable, a rod, a brace, or a combination thereof. A harness (e.g., one or more belt, strap, or the like) may be used to create an anchor point on the user's limb for attaching the link. The harness and the link may optionally be provided with suitable quick connect-disconnect hardware to facilitate engaging and disengaging the apparatus. The harness and the link are preferably as light-weight as possible. Alternatively, at least part of the harnesses and/or the links may be incorporated into footwear and or clothing worn by the user. By employing such links the apparatus advantageously minimizes the load carried distally by the user. Embodiments include a drive train that integrates the captured motion of the pair of limbs to drive a single generator. The apparatus avoids or substantially reduces duplication of mechanical and/or electrical components, and minimizes weight of the apparatus.

An apparatus as provided herein has numerous uses in consumer, recreation, gaming, and military applications. Portable electronic devices are ubiquitous, and many users carry more than one such device. Batteries almost exclusively power these devices, and the energy per unit mass in batteries is limited, both factors that constrain the performance of portable devices, and limit the duration of operation. Biomechanical power generation as described herein provides the ability to power such devices and/or charge batteries, resulting in a substantial improvement to the operating time and/or performance of a portable device, while avoiding the unattractive solution of larger and/or heavier batteries, or replacement disposable batteries.

Design Considerations

Figure 2A:
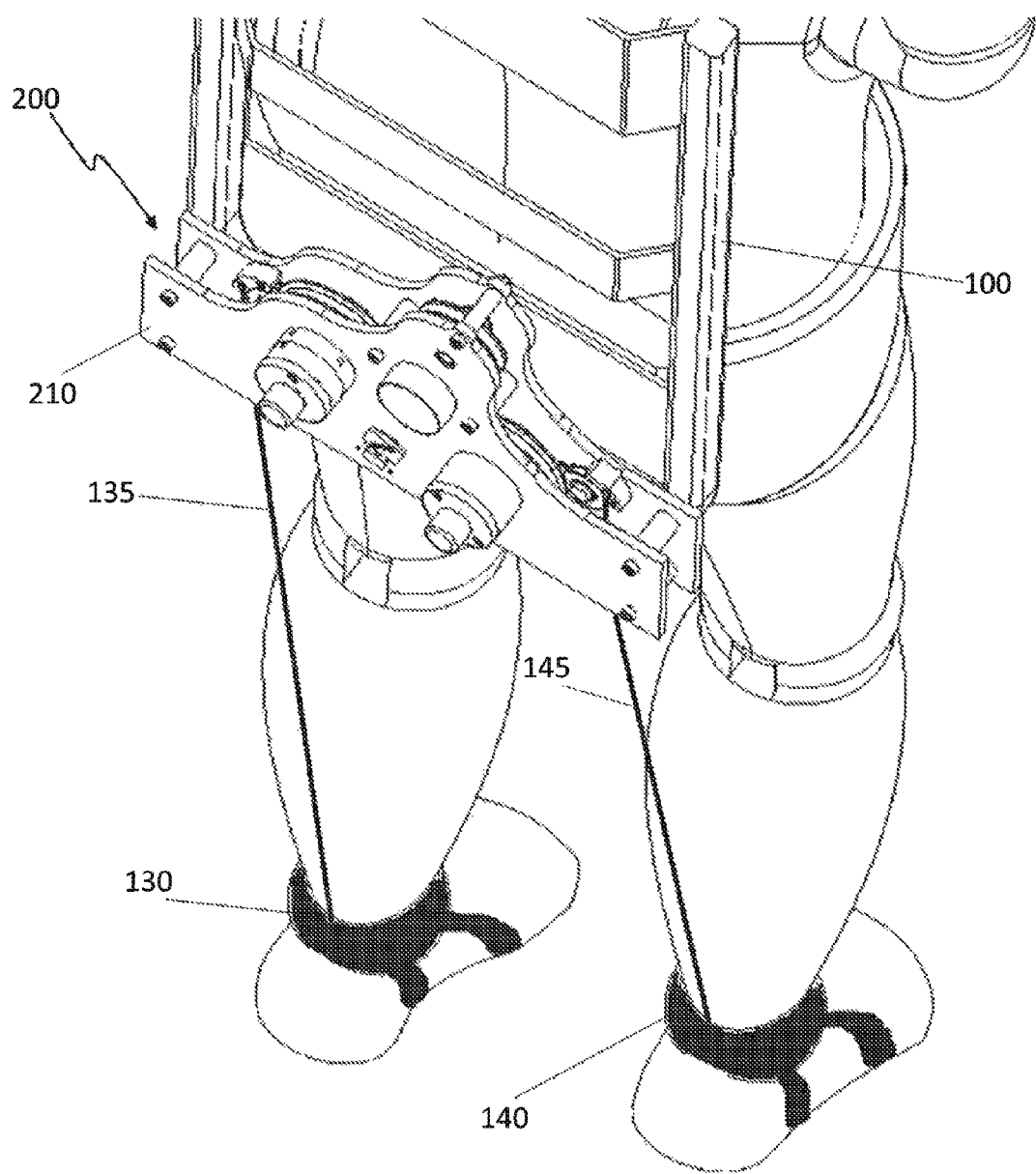
FIG. 2A is a schematic diagram of a biomechanical electrical generation apparatus configured to be worn on a user's back, according to another embodiment.

Design considerations in accordance with one configuration to be worn on the user's back and that uses the motion of the legs during walking, will now be described. The embodiments shown in FIGS. 1A-1B, FIGS. 2A-2C, and FIGS. 3A-3B are based on the same principle, but have different arrangements of the mechanical/electrical components such that the arrangement in FIG. 2A is more compact and lightweight (compare FIG. 1B with FIGS. 2B-2C). A further refinement of the mechanical/electrical components is shown in the embodiment of FIGS. 3A-3B. Referring to these figures, wherein like reference numerals refer to like components or mechanical equivalents, the embodiments generally comprise a leg motion-capturing apparatus, a drive train, cable retrieval mechanisms, a generator, and power conditioning and/or distribution components.

Mechanical and electrical components, generally indicated by reference numeral 200, include the input pulleys, the drive train, the cable retrieval mechanisms, the generator, and the power conditioning/distribution components. These may be supported by a chassis or housing 210, and the housing mounted to a backpack frame 100 (e.g., Aruc Systems, USA) using suitable hardware, spacers, and the like, to achieve a desired orientation of the apparatus on the frame. Shoulder straps 110 and an optional hip belt 120 of the backpack frame transfer the load of the apparatus onto the user. The embodiment of FIG. 3A-3B is configured for modular incorporation into a backpack or other carrying apparatus, using, for example, straps, quick-connect buckles, and the like, and includes guides 280 for this purpose.

The motion-capturing apparatus includes two foot harnesses 130, 140 and two corresponding cables 135, 145. Mechanical energy is transferred into the apparatus by the two adjustable foot harnesses (e.g., 5 Point Foot Harness, Nautilus Inc., USA), which are attachable to the user's footwear and are able to fit a wide range of footwear. The foot harnesses provide an anchor point for the links. Use of harnesses may be avoided by providing footwear with a suitable hook, loop, etc., for connection to the links. The links, which may be cables, such as nylon-coated, stainless steel wire rope, are attached at one end to heel straps of the foot harnesses. The opposite end of each cable is attached to an input pulley 230, 240 of the apparatus.

Figure 4A:
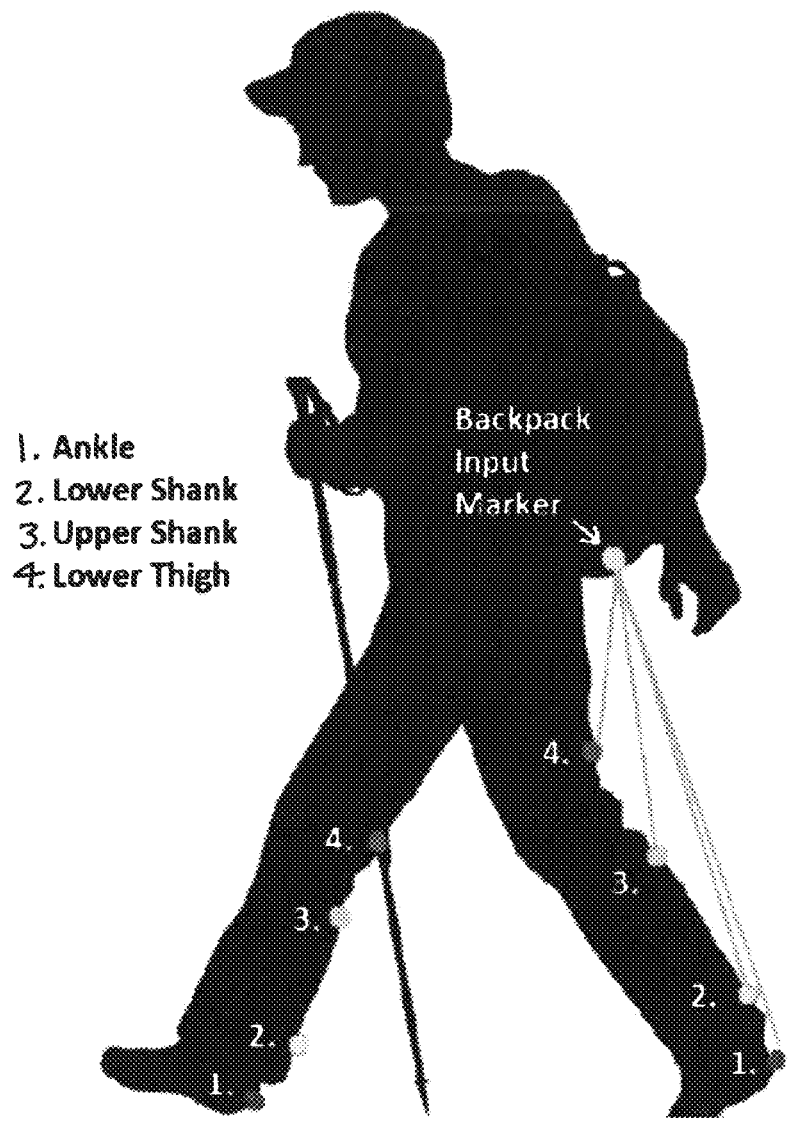
FIG. 4A is a schematic diagram showing possible anchor points for links, e.g., cables, of a back-mounted biomechanical electrical power generating apparatus.
Figure 4B:
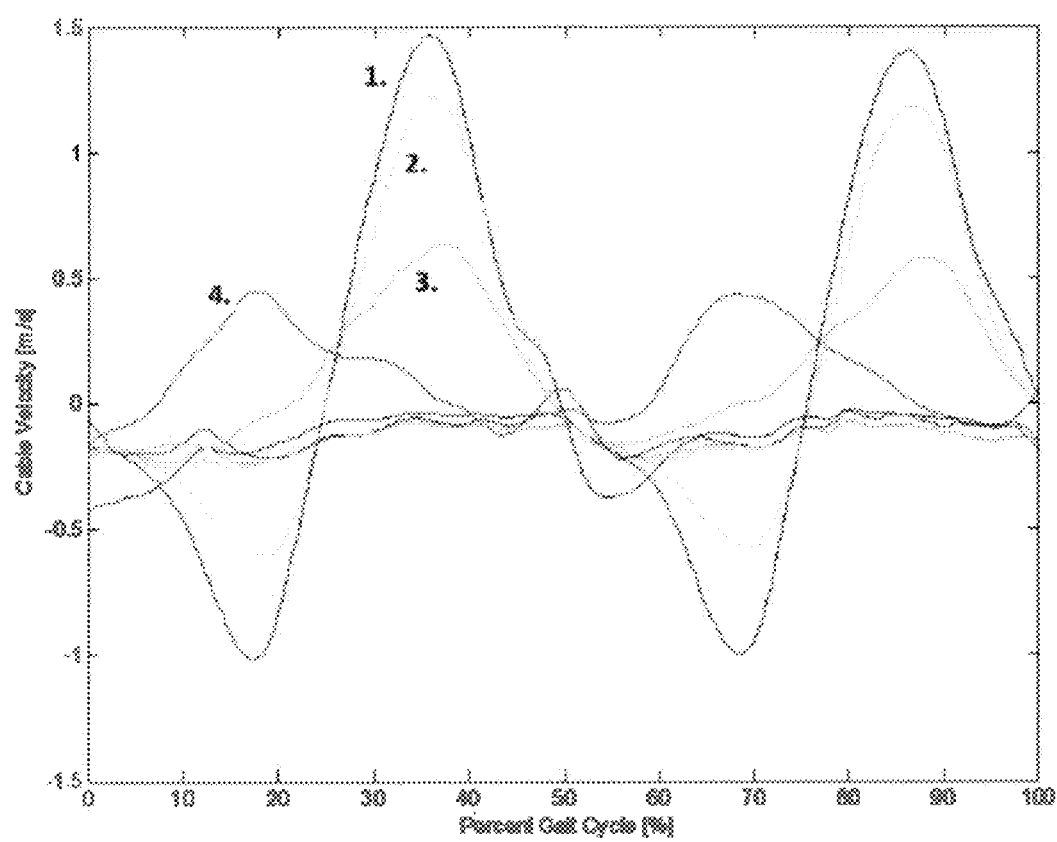
FIG. 4B is a plot showing cable velocity as a function of the percentage of the gait cycle of a walking user for the anchor points of FIG. 4A.

Alternatively, anchor points may be provided elsewhere on the user, using suitable harnesses, footwear, or clothing adapted for mechanical connection to the links. For example, FIG. 4A shows possible anchor points other than the foot (1) e.g., heel or ankle, such as (2) the lower shank, (3) the upper shank, and (4) the lower thigh. FIG. 4B is a plot of the cable velocity for a cable attached at each of anchor points (1)-(4) in FIG. 4A, for a user walking at about 1.1 m/s, wherein the proximal end of the cable was attached to the input of a backpack-mounted power generation apparatus as described herein. The cable velocity was determined by calculating the derivative of the relative cable length. The relative cable length was determined using reflective markers on the user's legs and on the cable insertion point on the apparatus. The markers were tracked using a twelve-camera motion capture system (Qualisys Oqus, Gothenburg, Sweden).

As noted above, a motion integrator 255 of the drive train integrates motion of both of the user's legs, so that only a single generator 250 is required, rather than one generator for each leg. Consequently the apparatus achieves low weight and cost while maximizing the amount of electrical power produced. The design of the drive train may be optimized for a particular generator. For example, a miniature generator may require high RPM/low torque for efficient power generation. In such case the drive train should amplify the rotational velocity of the input pulleys, prior to engaging the generator. The drive train may include two or more stages to achieve a desired RPM for drive the generator. For example, in the embodiment shown in FIGS. 2A-2C, the drive train has three stages, with an overall gear ratio of 18:1. In one three-stage embodiment the first stage has a gear ratio of 3:1, and is made up of a three-pulley system. This stage combines and amplifies the motion of each of the user's legs, prior to transferring it to the second stage. In one embodiment the second and third stages have gear ratios of 3:1 and 2:1 respectively. These stages serve to further amplify the rotational velocity. It will be appreciated that other numbers of stages and gear ratios may be provided, and may be designed and/or optimized for a user (e.g., based on body size and/or strength) and/or for a given application. A combination of stages and rear ratios as exemplified herein allows for the momentum gain of each stage to be transferred to the next stage. Thus, in the case of bipedal locomotion, for example, where motion is captured during the swing phase of each limb, the momentum gained continues to drive the generator between swing phases of the two limbs.

Although the term "gear ratio" is used herein, the drive train may employ gears or pulleys and belts, or a combination thereof. The drive trains shown in FIGS. 2A-2C and FIGS. 3A-3B use pulleys and belts. Pulleys and belts were chosen instead of gears because they produce less noise. Unidirectional roller clutches 235, 245 associated with the input pulleys 230, 240, which may be integrated into or mounted on the input pulleys, allow for motion to be captured only during extension, and not retraction, of the cables. Retraction of the cables occurs during the stance phase of the gait cycle.

The cable retrieval mechanisms 237, 247 include a constant tension spring that provides tension in the cables and rewinds the cables 130, 140 when not under extension. This eliminates slack between the foot harness and the input pulley of the system. The springs may be, for example, constant tension springs, non-constant tension springs, or linear springs. In one embodiment the springs exert constant force, independent of their deflection, which may reduce the risk of tripping to the user. Other embodiments may employ common tension or compression springs that exert greater force as they are extended.

The generator 250 may be, for example, a brushless AC generator or a DC generator. A brushless AC motor, may be used as the generator. Preferably, the generator has a small speed constant, low internal resistance, and small rotor inertia. Linear generators may also be used. The electrical components 260 may include circuitry, which may include passive and/or active devices, wiring, and connectors. The circuitry may receive the generator output power and may perform functions such as power conditioning, for example, rectification (i.e., AC-DC conversion), filtering, and regulation (e.g., at a constant output voltage). The wiring and connectors may include one or more connectors suitable for direct connection to one or more portable electronic devices, and/or to charge batteries. The circuitry may include one or more components for adjusting/controlling the amount of electrical power being generated. For example, in high power demands, the electrical power production can be increased to meet the need; whereas in low power demands, the electrical power production can be decreased to reduce the load on the user.

Modelling

Modelling of an embodiment configured to be worn on the user's back and capture the user's leg motion (referred to herein simply as a "backpack") will now be described. The model was used to predict the amount of electrical power that could be generated and the associated load on the user.

The mechanical resistance (force) applied to the user by the backback is the summation of the loads produced by both the mechanical and electrical systems. The mechanical resistance is due to the apparent inertia of the drive train as well as friction, while the electrical load comes from the mechanical energy required to generate electricity. The backpack has several design parameters, such as the gear ratio, the generator parameters (including the internal resistance, rotor inertia, and the speed constant), and the electrical load. This allows for numerous different configurations for producing a required amount of electrical power and resistance to the user. A combination of these parameters determines the electrical power output and the mechanical resistance to the user.

Figures 6A, 6B, 6C, 6D:
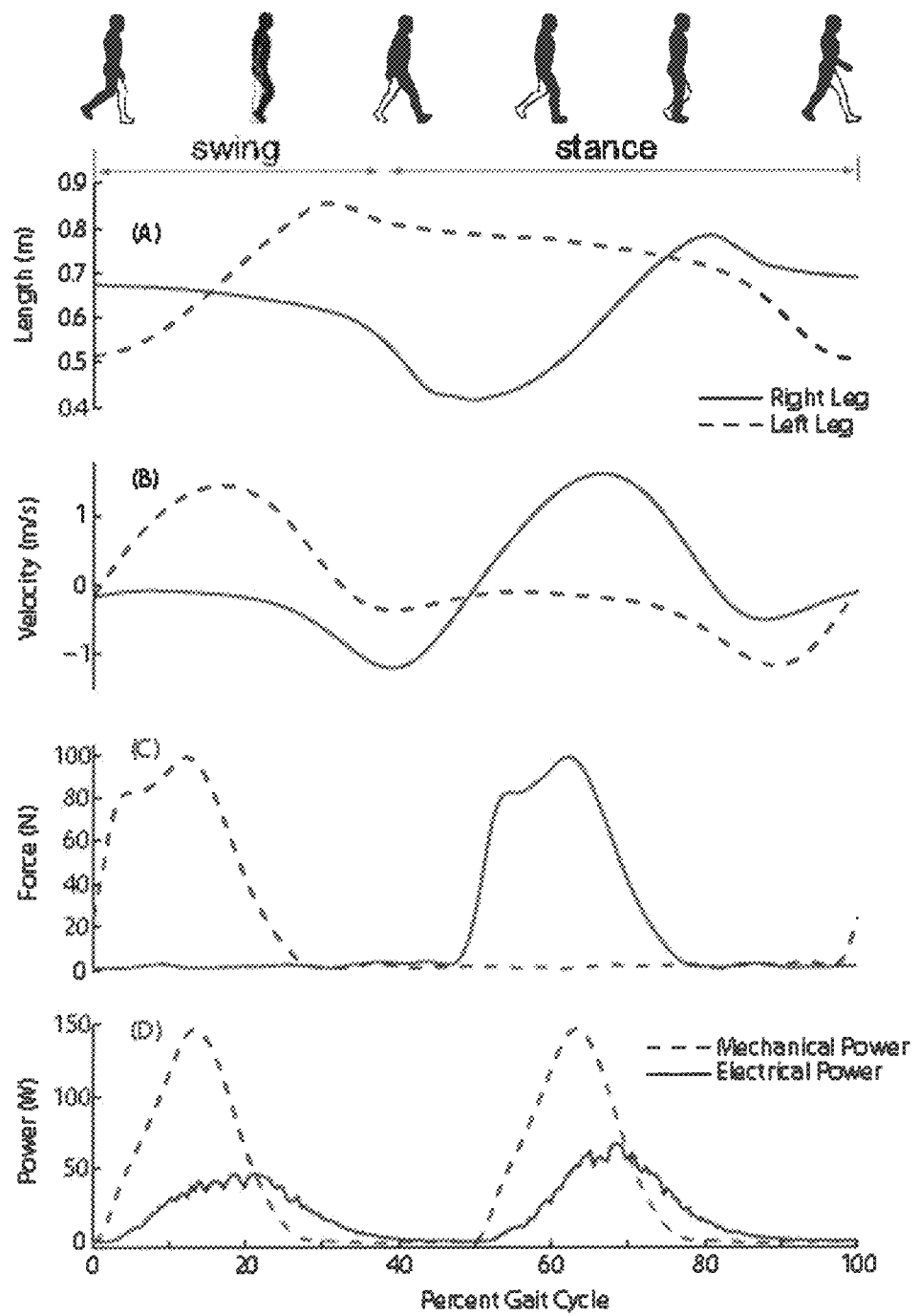
FIGS. 6A-6D show experimental results during human walking trials from a representative user and the embodiment of FIG. 2A.

In the model, the changing linear displacement between the backpack and the user's feet was captured by two independent cables (i.e., links). The cables connected the user's feet to the input pulleys of the drive train to produce rotational motion in the drive train. The drive train increased the speed (i.e., RPM) of the rotational motion, which was coupled to a generator to generate electricity. FIG. 6A shows the change in cable length through a human gait cycle.

The cable velocity was determined to be the derivative of the cable length (FIG. 6B).

$$V_c = \frac{\Delta S_c}{\Delta t} \quad (1)$$

Where $V_c$ is the cable velocity (m/s), $S_c$ is the cable length (m), and t is time (s).

A unidirectional roller clutch associated with each input pulley allows the gear train to only be driven in the direction that the cable is lengthening. For example, for human bipedal locomotion, lengthening of the cables occurs during the swing phase of the user's gait cycle.

The linear input velocity was then converted into rotational velocity through the input pulley and amplified through the drive train, $$\omega_g = (V_c/r) \cdot r_t \quad (2)$$

where $\omega_g$ is the angular velocity of the generator, $V_c$ is the input cable velocity, r is the radius of the input pulley, and $r_t$ is the overall gear ratio of the drive train.

The line-to-line voltage produced by the generator was calculated as $$E_g = \frac{\omega_g}{K_g} \quad (3)$$

where $K_g$ is the electromotive force (EMF) constant (v/rpm) provided by the generator's manufacturer. The EMF constant is dependent on the dimension of the motor winding, the number of winding turns, and the strength of the magnetic field of the generator. The three-phase voltage from the generator was rectified using a full-wave rectification circuit before connecting to an external load resistor.

The current was determined by equation $$I_l = \frac{E_g - 2 \cdot E_d}{R_l + R_g} \quad (4)$$

where $R_1$ is the electronic load, which can be an electronic device or battery charger, $R_g$ is the generator internal resistance, and $E_d$ is the forward drop voltage (V) of the rectifying diode used in the full-wave rectification circuit, which is around 0.6 V.

When generating electrical power, the generator produced a reaction torque acting on the drive train, $$T_g = I_l \cdot K_t \quad (5)$$

where $K_t$ is the torque constant (N·m/A), and $I_l$ is the current (A).

The reaction torque $T_p$ that was applied at the input pulley was amplified by the drive train, $$T_p = T_g \cdot r_t \quad (6)$$

Besides the reaction torque $T_p$ acting on the input pulley produced from power generation, additional input torque $T_a$ is required to accelerate/decelerate the drive train and the generator rotor, which was calculated as $$T_a = J_a \cdot \alpha_I \quad (7)$$

where $J_a$ is the apparent inertia at the input pulley and $\alpha_I$ is the angular acceleration of the input pulley.

The total input torque $T_i$ at the input pulley is the sum of the toque required to produce electricity and drive the mechanical components, $$T_i = (T_p + T_a)/\eta_t \quad (8)$$

where $\eta_t$ is the overall mechanical efficiency in the drive train. This efficiency depends on the input speed and electrical load, which varies during different portion of a gait cycle.

With the total torque on the input pulley, the required force on the cable is calculated as $$F_c = T_i/r_i \quad (9)$$

where $r_i$ is the radius of the input pulley.

The electrical power delivered to the load is calculated as $$P_e = \frac{E_l^2}{R_l} \quad (10)$$

Where $E_l$ is the voltage applied to the load, and $$E_l = E_g - 2E_d$$

To generate the electrical power $P_e$, the input mechanical power for the backpack is $$P_m = F_c \cdot V_c \quad (11)$$

The overall efficiency of the backpack is calculated as the ratio between the generated electrical power and the required mechanical power input, $$\eta = \frac{P_e}{P_m} \quad (12)$$

The overall efficiency can be experimentally determined by measuring the mechanical power input and the electrical power production.

The overall efficiency of the backpack can be alternatively expressed as a combination of electrical power generation efficiency and the drive train efficiency, $$\eta = \eta_g \cdot \frac{R_l}{R_l + R_g} \quad (13)$$

Here we neglect the energy dissipated in the diodes. With a known power generation efficiency, and the overall efficiency determined from Eq. 12, the drive train efficiency can be estimated from Eq. 13.

Adaptive Control

Embodiments described above use a constant electrical load, e.g., through a high-power resistor. Such embodiments present a constant mechanical load to the user. Data indicate that increasing the electrical load does not affect the walking kinematics of the user. That is, under different load conditions, both the cable length and cable velocity profiles are similar in shape and amplitude. This indicates that an adaptive control scheme can be implemented for different electrical load conditions. Accordingly, adaptive control strategies were implemented to increase the electrical power production substantially without negatively affecting the user's gait kinematics or the metabolic cost of walking.

In adaptive control embodiments, the electrical load, and consequently the mechanical load presented to the user, is varied during different activities (e.g., walking, running, and stair climbing) and/or during different phases of the gait cycle of such activities. For example, by timing engagement of the generator with specific phases of gait, negative effects (e.g., increased metabolic cost of walking) that the power generation apparatus has on the user are reduced, and user comfort is improved.

As in the above embodiments, adaptive embodiments are driven through two input cables that are attached to corresponding input pulleys. Limb motion is inputted during extension of the cables from the device. Roller clutches decouple the input pulleys, allowing retraction of the input cables to be independent of power generation or motion input.

Figure 7:
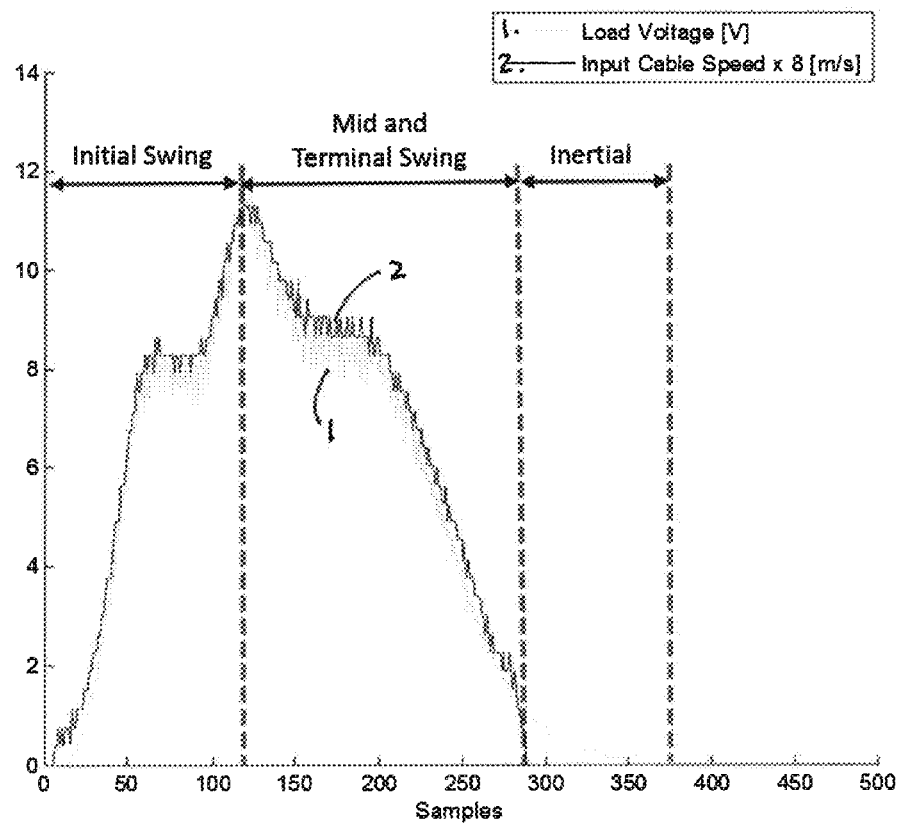
FIG. 7 is a plot showing representative load voltage and input cable speed profiles for one leg during three periods of an electrical power generation cycle.

As discussed above, the gait cycle has two phases: the swing phase, in which a foot is not contacting the substrate, and the leg/foot is swinging forward from the rearmost position to the foremost position; and the stance phase, in which the foot is contacting the substrate and is substantially stationary. In the embodiments described herein, electrical power generation mainly occurs primarily during the swing phase of gait. As shown in FIG. 7, electrical power generation duration may be segmented into three periods: 1, initial swing; 2. mid and terminal swing; and 3. inertia motion. The initial swing period is characterized by the lifting of the limb from the substrate to a position where the knee achieves maximum angular velocity. During this period, muscles are used to accelerate the limb. The mid and terminal swing period occurs immediately after the knee achieves maximum angular velocity. This period starts with the tibia being moved to a vertical position with respect to the substrate, and ends prior to the foot making initial contact with the substrate. During this period, the knee flexor muscles are used to decelerate the lower limb. The inertia motion period occurs when the generator overruns the input pulley. That is, the motor/generator overruns or decouples from the input pulley due to the unidirectional clutch, such that the rotational velocity of the motor is greater than that of the input pulley. Therefore, when the cable is retracting, the motor will continue spin due to the inertia, and the generator continues to generate electricity.

In some embodiments, sensors are used to determine the three periods of electrical power generation referred to above. In such embodiments, sensors may include, but are not limited to, one or more encoder, load cell, and/or inertia sensor. The sensors are used to determine the timing of events in a gait cycle, such as the three periods of the swing phase, used for timing of adaptive control. In other embodiments, timing-based methods are employed, wherein sensors may not be required.

According to one sensor-based embodiment, an encoder is mounted on the input pulley shaft and another encoder is mounted on the generator shaft. The encoders measure the angles and angular velocities of the shafts. When the angular velocity of the input shaft reaches a maximum, the initial swing period ends and the mid and terminal swing period starts. By comparing the angular velocities between the two shafts, the time in the gait cycle at which decoupling of the input pulley and the generator occurs can be detected. When the generator speed is higher that the input shaft speed, the decoupling occurs, and the system enters the inertia motion period of the power generation cycle.

According to another sensor-based embodiment, a combination of one or more inertia sensor and one or more load cell is used to determine the three periods of the power generation cycle. An inertia sensor (e.g., an accelerometer and a gyroscope) mounted on the lower-limb measures the angular velocity of the lower limb. The second period of power generation starts as the knee achieves maximum angular velocity. Two load cells, mounted on the two input cables, measure the cable force (or tension). At the time when the third period starts, the generator and the input pulley are decoupled. The decoupling causes the cable tension drop, and it may approach substantially zero, and this is sensed by the load cell and used to detect the third period of the power generation cycle.

According one timing-based embodiment, a predictive model is used to determine the different periods of the power generation cycle. In this embodiment sensors as described above are not used, and the generator voltage is used to determine timing of the generator load. For example, to determine the start and the end of the three power generation periods described above. This technique is based on the relationship between the power generation periods and the different gait phases of walking. In one embodiment, after measuring the generator output voltage, the start and end time of each power generation period are determined as percentage of the overall power generation cycle. The duration of each generation period is affected by the user's step length, step frequency, and walking speed. Embodiments may use a mapping of the power generation period durations and user's gait parameters, which may be generated through a walking experiment.

Figure 8:
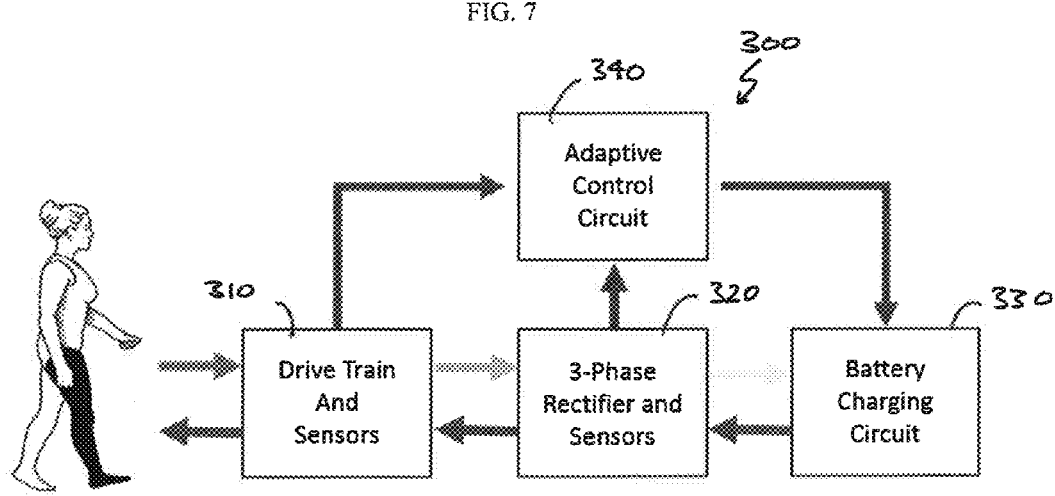
FIG. 8 is a generalized block diagram of an adaptive power generation apparatus, according to one embodiment.

FIG. 8 shows one embodiment of the adaptive power generation apparatus 300. The apparatus includes four major subsystems 310, 320, 330, 340. Three of these subsystems, the drive train and sensors 310, the rectifier and sensors 320, and the charging circuit 330, may be substantially similar to those of non-adaptive embodiments described above, with the exception of sensors. This embodiment also includes adaptive control circuit 340. Limb motion inputted into the system is manipulated and measured with the mechanical drive-train and sensors 310 prior to engaging the motor/generator. Electrical power from the generator is then rectified and measured at 320. The adaptive control circuit 340 detects gait phase and measures electrical power generation parameters from the drive-train and rectifier measurements. The control circuit alters the electrical load of the battery charging circuit 330 in accordance with the user's gait. The electrical and mechanical loads are reflected back to the user such that user comfort and efficiency are improved. Adaptive control embodiments may be implemented in hardware or in software, or a combination thereof.

Sensor-based embodiments of the adaptive apparatus operate by sensing the different periods of gait and varying the electrical load (i.e., the current draw), so that different loads are applied during different periods of the generation phase. For example, different loads may be applied during the three periods of the swing phase described above. However, variations may be implemented. For example, gait may be characterized as having fewer or more periods, and the electrical load varied accordingly. Such different characterizations may be derived, e.g., for a specific activity of the user, for different species of user, for a user with a disability that affects gait, etc. Moreover, such different characterizations of gait may be progammed and saved in the adaptive control circuit 340, and selected (e.g., by a user interface/menu) for a given user and activity.

Electrical load is proportionally related to the current draw of the apparatus, such that larger electrical loads relate to proportionally higher current draws. In a further embodiment, the control circuit may produce a force/resistance to slow the limb during the mid and terminal swing period, resulting in a lower user effort (metabolic cost) associated with the same amount of electrical power production. This is because the apparatus would produce some of the required braking muscle force for the body and the user would not have to activate those muscles to the same extent.

In accordance with the adaptive control circuit, and the ability to program the circuit for different gait periods and characterizations, the electrical load (e.g., current draw) applied to the apparatus may be made to resemble any profile (e.g., a waveform such as a ramp, saw tooth, sinusoidal, etc.), so that all characteristics can be modified, including the amplitude, period, and profile. This flexibility allows for optimal current draw to be applied during each of the different phases and periods of gait.

Adaptive control embodiments may include one or more features to modify and/or adjust the current load profile to enhance and/or optimize the user's comfort. For example, if the current load is suddenly applied, it may cause a tripping effect. Therefore, adaptive control embodiments may include a feature wherein the current load is changed gradually. For example, the current load profile may be a ramp, which can be modified to have many different slopes or profiles (e.g., hyperbolic tangent). Once the motor has decoupled from the input (during the inertia segnnent), the resistance is held at its maximum to quickly dampen the motion of the mechanical system. This causes the dampening torque being induced by the electrical system to be significantly larger than that of the frictional damping torque. As a result, the amount of energy lost to heat is decreased, and therefore an increase in the efficiency of electrical power production.

Embodiments are further described by way of the following non-limiting examples.

Example 1

Figure 2B:
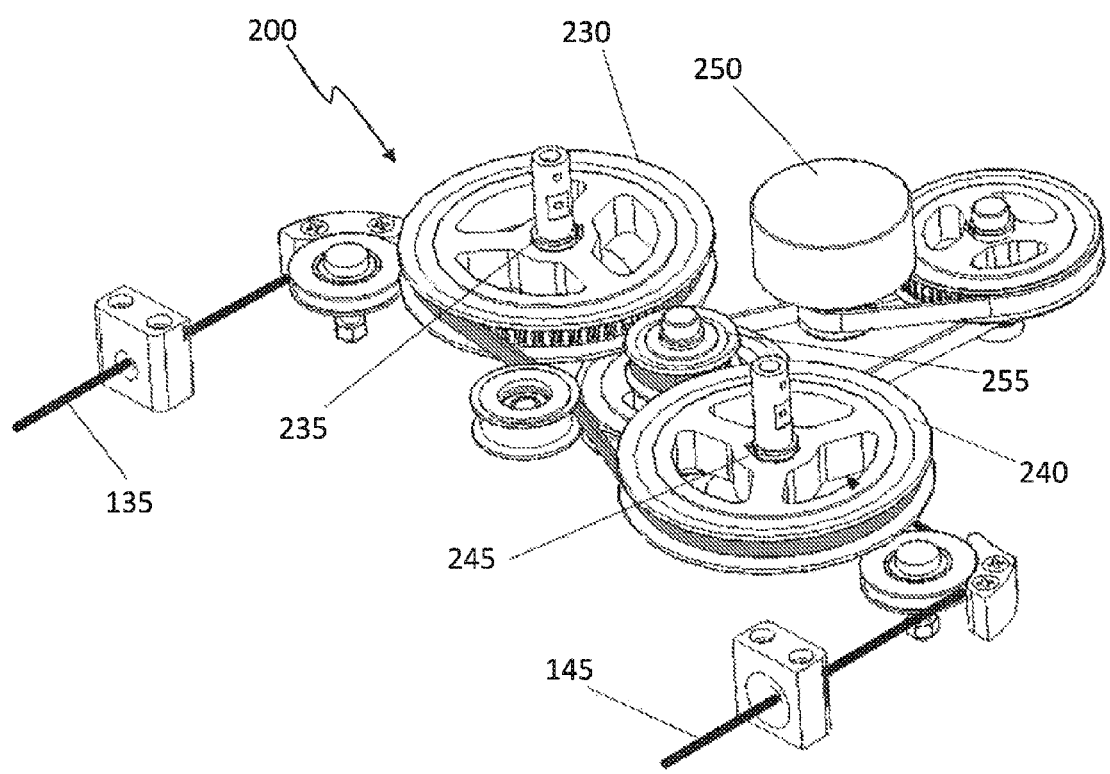
FIGS. 2B and 2C are enlarged views of mechanical and electrical components of the embodiment of FIG. 2A.
Figure 2C:
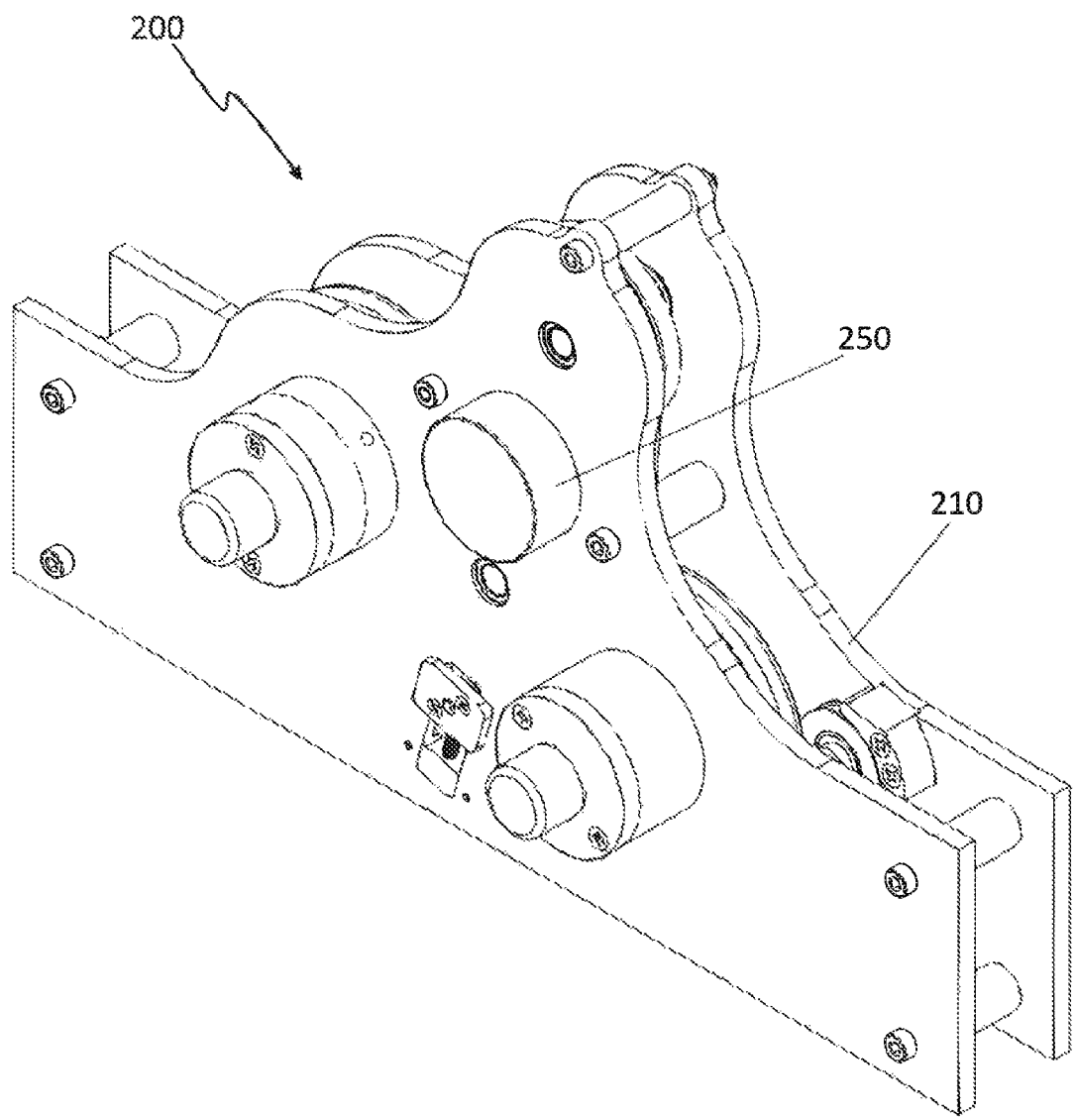
Figure 3A:
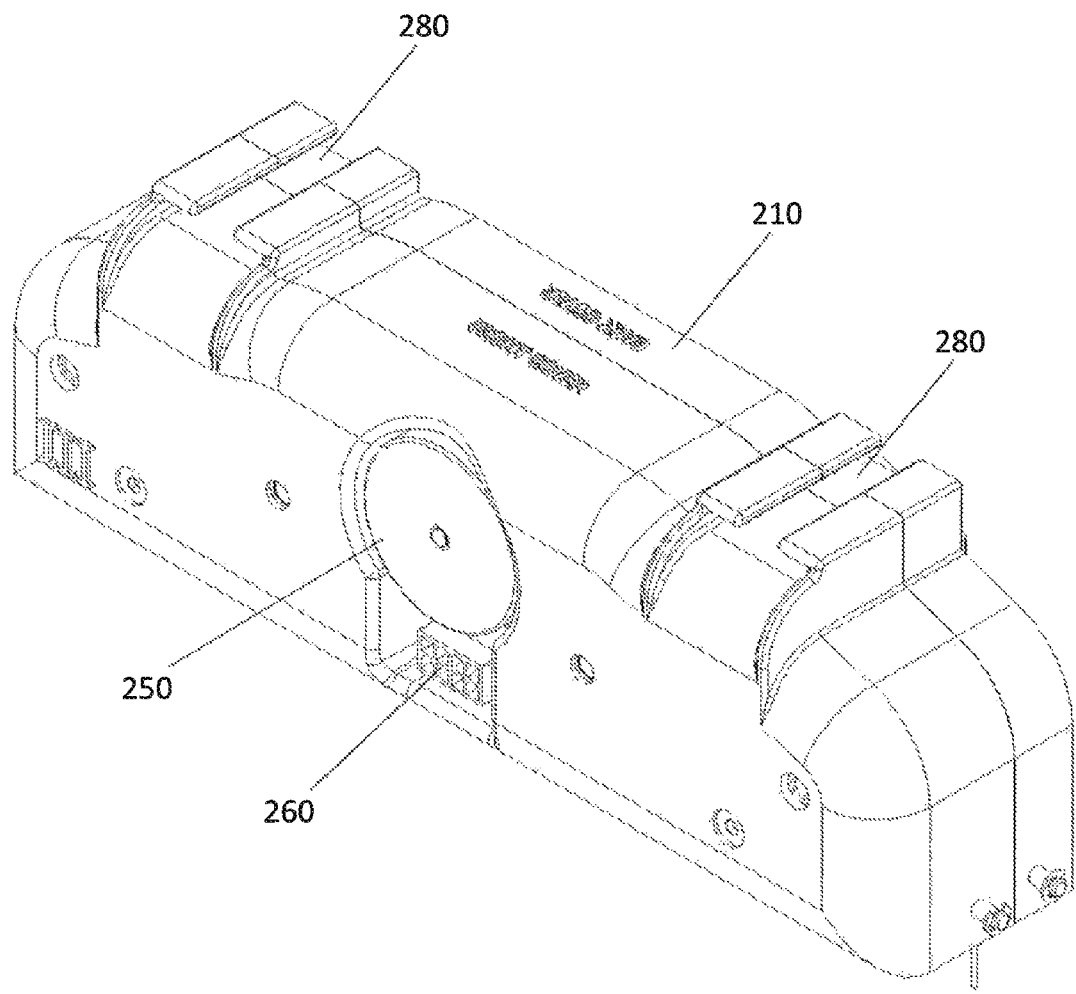
FIG. 3A is a schematic diagram of a biomechanical electrical generation apparatus, according to another embodiment.
Figure 3B:
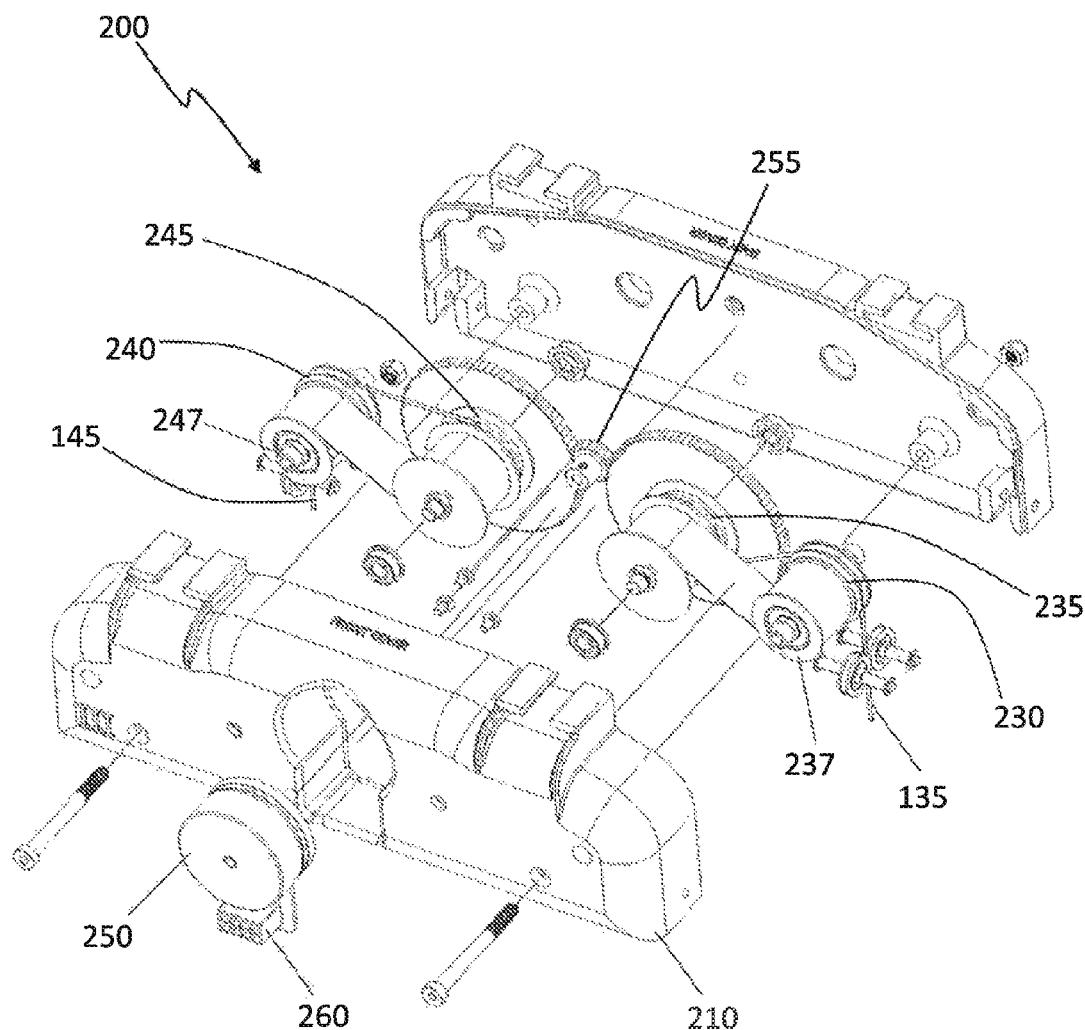
FIG. 3B is a schematic diagram of mechanical and electrical components of the embodiment of FIG. 3A.

An embodiment configured to be worn on the user's back and capture the user's motion was built as shown in FIGS. 2A-2C. Two 5-point foot harnesses (Nautilus Inc. USA) attachable to the user's shoes were used to anchor the two input cables. The cables were prepared from nylon-coated, stainless steel wire rope, and included hardware at one end for attaching to the heel straps of the foot harnesses. The opposite end of each cable was attached to an input pulley of the system. The cable retrieval mechanisms, drive train, generator, and power conditioning/distribution components of the system were supported within a housing that was mounted to the lower end of a standard backpack frame (Aruc Systems, USA). The hip and shoulder-straps of the backpack frame transferred the load produced by the apparatus to the user. The weight of the apparatus alone was 2.27 Kg and the total weight including the backpack was 6.68 Kg.

The drive train included three stages, with an overall gear ratio of 18:1. The first stage had a gear ratio of 3:1, and was a three-pulley system. This stage combined and amplified the motion of each of the user's legs, prior to transferring it to the second stage. This allowed for momentum gained from the previous stage to be transferred to next stage. The second and third stages had gear ratios of 3:1 and 2:1 respectively. Belts/pulleys were used instead of gears to reduce noise associated with spur gears. However, gears may also be used, as could a combination of gears and belts/pulleys. Uni-directional roller clutches, located in the input pulleys, allowed for motion to be captured only during extension, and not retraction, of the cables.

For the generator, a brushless AC motor (Maxon EC-Powermax 30 200 W; Maxon Motor AG, Switzerland) was used. The power conditioning components included a full-wave rectifier and a power resistor was used to dissipate the generated electricity. The amount of electrical power being generated could be adjusted by varying the electrical load (i.e., the resistance of the resistor). This provided an option for generating a larger amount electrical power without increasing the gear ratio.

Performance of the apparatus was evaluated through bench-top testing and a human walking experiment.

A. Bench-Top Testing

Bench-top testing was performed to evaluate the accuracy of the above-described apparatus model in predicting the amount of electrical power generated and the associated reaction force on the user. The input motion profile was generated with a bench-top motor (Maxon EC-Powermax 30, Maxon Motor AG, Switzerland) with 23:1 gear ratio, which drove one input cable and pulley. The input angular velocity to the generator was measured by a quadrature encoder on the generator. The encoder pulse signals were collected using the quadrature encoder input on a data acquisition (DAQ) card (NI PCIe6353, National Instruments, USA). The generator angular velocity was used to calculate the linear velocity of the input cable. Acceleration of the input cable was also calculated to estimate the forces due to the inertia of the system. The DAQ card also measured the voltage across the load resistor with a known resistance (10 Ohm), which was used to calculate the electric current and the amount of electric power generated. To measure the amount of mechanical power input to the system, the reaction force on the cable was measured by a load cell (ATI Industrial Automation, Apex, N.C.) mounted on the cable. The drive train efficiency is not a constant and it is dependent on the input cable speed and the electrical load applied to the system. Therefore, a mechanical efficiency map was established under a set of combinations of these two parameters by using Eq. 12 and Eq. 13. With this efficiency map, the required pulling force on the cable can be predicted based on the model presented above. The accuracy of the model was determined by comparing the model predicted force with the cable force measured by the load cell.

B. Human User Testing

A human walking experiment was performed to determine the amount of electrical power that the apparatus could produce during walking, and to evaluate the metabolic consequence of the apparatus on the user.

1) Users:

Five healthy male adults volunteered to participate in this study (mean age 24. (SD 3.0), mean mass 76.1 kg (SD 13.3)). None of the users had any known injuries, past or present, that affected their gait. All users gave informed consent according to the policies of Queens University's General Research Ethics Board.

2) Experimental Procedure:

Data collection was conducted at the Human Mobility Research Center of Hotel Dieu Hospital, Kingston, Ontario. Each user participated in seven walking activities, which took a total of two hours over the course of one day. The walking activities were conducted at 1.2 m/s on a split-belt force instrumented treadmill (AMTI Force-Sensing Tandem Treadmill, AMTI, Watertown, Mass., USA) with ground reaction forces measured. Prior to the treadmill trials, the users were given a five- to ten-minute acclimation period, after which the experimenter measured their resting metabolic power (RMP) during quiet standing. Metabolic costs were measured in four walking activities: (1) Normal walking, walking without wearing the apparatus, which provided a baseline; (2) Weight-only, walking while wearing the apparatus without foot harnesses attached, used to evaluate the cost for carrying the weight of the apparatus; (3) Mechanical engagement, the user wore the apparatus with the foot harnesses attached and electrical power generation was turned off by leaving the circuit open, used to determine the effects of the mechanical apparatus on the metabolic cost; and (4) Electrical engagement, the user wore the apparatus and power generation was engaged. The metabolic cost in (4) included all the costs from (2) and (3), plus the cost of electrical power generation. Each trial lasted ten minutes. To determine the relationship between the amount of power generated to the load resistance, additional walking trials were performed at three different electrical loads (10 ohms, 18 ohms, 22 ohms; one load per trial) without measuring rate of oxygen consumption and carbon dioxide production. Each trial lasted two minutes. A three-minute rest period followed each trial. The order of the trials was randomized.

3) Metabolic Measurements:

To measure the energetic consequence of the apparatus on the user, the rate of oxygen consumption and carbon dioxide production was measured using open respirointery ($K^4b^2$, COSMED, Italy). Metabolic power was calculated for each trial using a standard equation as provided in Brockway, J. "Derivation of formulae used to calculate energy expenditure in man," *Human Nutrition-Clinical Nutrition*, 41:463-71, 1987). Metabolic data during the third quarter of each trial was analyzed to allow the user to reach steady state, as well as to prevent end-effects and fatigue. The net metabolic increase was calculated by subtracting the resting metabolic power from the metabolic power calculated during each trial.

4) Electrical and Mechanical Power:

The electrical voltage applied to the load was measured using a data acquisition card (NI DAQCard-6024E, National Instruments, USA) and a custom-made Matlab Simulink program with a laptop computer. The sample rate was chosen as 600 Hz. The instantaneous electrical power was calculated as $$P_e(t) = \frac{E_l^2(t)}{R_l} \quad (14)$$

where $P_e(t)$ is the instantaneous electrical power, $E_L(t)$ is the instantaneous voltage on the load, and $R_l$ is the resistance of the load. The average electrical power produced by the apparatus was determined by averaging the instantaneous electrical power for 10 steps in the middle of a trial. The instantaneous input mechanical power to the system was calculated as the product of the force applied to the cable and the relative velocity of the foot harness and the system. A load cell (Nano 25, ATI Industrial Automation, USA) was mounted between the foot harness and input cable on the user's right leg to measure the force on the cable. Force data was acquired using the same data acquisition card with a sample frequency of 600 Hz. The force data was filtered with a Butterworth filter with a cut-off frequency of 30 Hz before computing the mechanical power. The relative velocity was determined by calculating the derivative of the relative cable length. The relative cable length was determined by placing one reflective marker on the cable attachments on the foot harness and one on the cable insertion points on the system. These markers were tracked using a six-camera motion capture system (Qualysis Oqus, Gothenburg, Sweden). The relative cable length was calculated as the distance from the foot harness marker and the marker on the system. The mechanical power was only calculated when the cable is lengthening because mechanical energy only flows into the system from the user during the period the cable is pulled. The instantaneous mechanical power $P_m$ was calculated as $$P_m(t) = V_c(t) \cdot F_c(t) \quad (15)$$

where $V_c(t)$ is the relative cable velocity and $F_c(t)$ is the cable tension measured by the load cell. The average input mechanical power to the system was determined by averaging the instantaneous mechanical power over the same period as the average electrical power for each trial.

Results

Figures 5A, 5B, 5C, 5D:
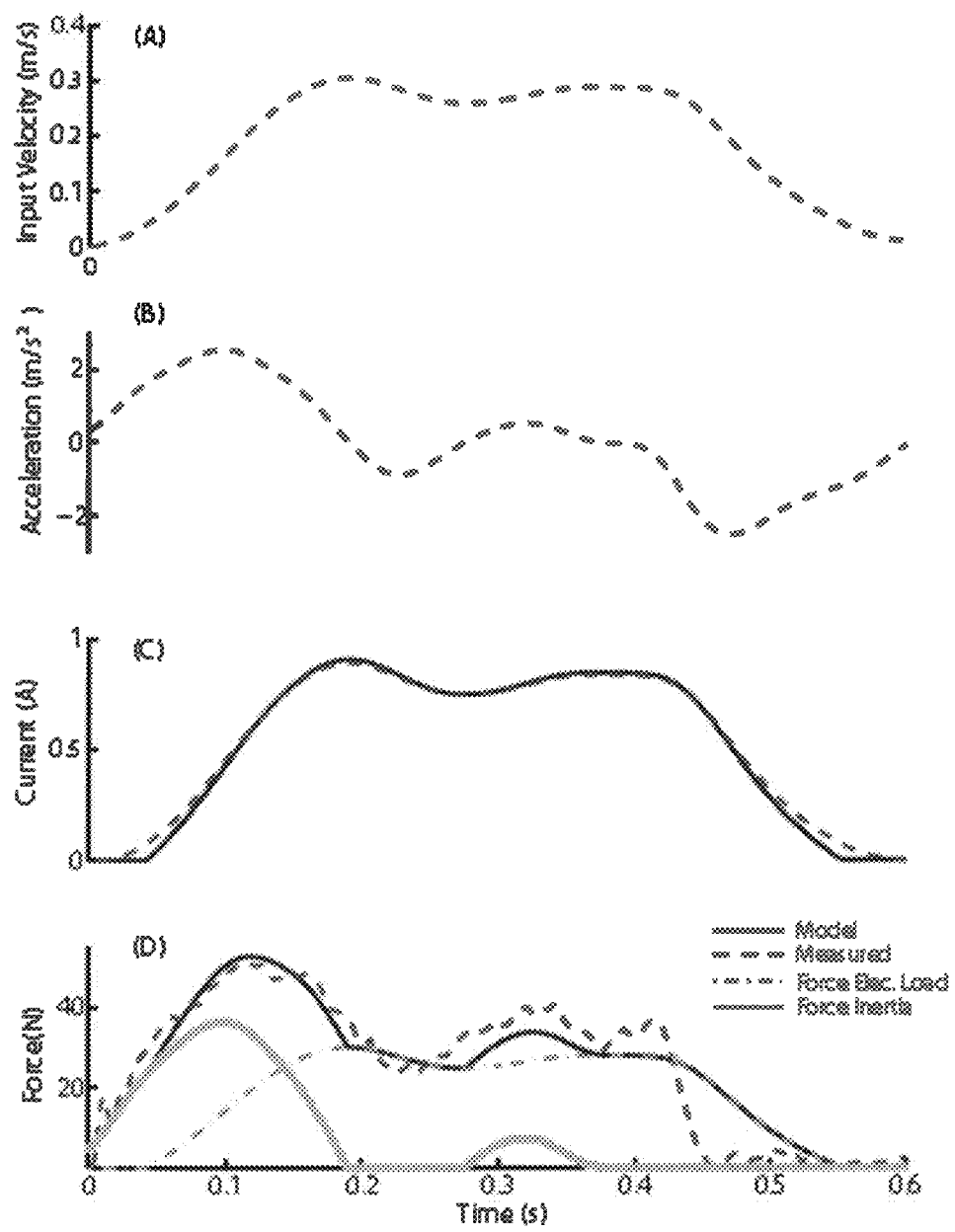
FIGS. 5A-5D show results from bench-top testing of the embodiment of FIG. 2A.

The results from bench-top testing are shown in FIGS. 5A-5D. From the measured cable linear velocity and acceleration (FIGS. 5A-5B), the model was able to accurately predict the current $I_l$ (FIG. 5C) and thus, the amount of electrical power generated. The model prediction of cable force consists of force for electrical power generation and inertia force (FIG. 5D). The combination of these two components predicted the total force on the cable and matched the measured force. After 0.45 s, the measured cable force reduced to approximately zero because the cable started to retract and thus, there was no cable tension between the driving motor and the input pulley. Overall, the model predicted the power production and the interaction cable force well.

Human experimentation results demonstrated that the amount of power generated by the apparatus is much higher than that generated by prior designs, such as the suspended-load backpack (7.4 W) and the knee-mounted generator (5 W). The electrical power generated under different load resistances is shown in Table I. It is evident that the apparatus was able to generate a large amount of electrical power, from 12 W under a load of 22 ohm to 19 W under a load of 10 ohm. The voltage waveforms under different load resistances exhibited a similar magnitude, and the difference in power production was mostly due to the current difference. The overall efficiency of power generation decreased as the load resistance increased, with the maximum efficiency of 48.4% at a load of 10 ohm.

During a gait cycle, the input cable lengthens during the swing phase and retracts during stance phase (FIG. 6A). Only when the cable velocity was positive, the lower limb drove the generator to generate electricity (FIG. 6B). The associated force resisted the lower limb motion during swing phase with a maximum magnitude of 100 N (FIG. 6C). The electrical power resembled a two-burst pattern in a gait cycle because of the use of the motion integrator. The electrical power exhibited a small lag to the input mechanical power due to the gear train motion delay (Ha 6D).

Table II shows the gross metabolic and net metabolic power during different activities: Normal walking, weighted walking, mechanical engagement, and electrical engagement. The metabolic cost of normal walking is similar to the results in literature. The cost of carrying the additional weight of the apparatus is 18 W. The net metabolic cost of generating 15 W electrical power is about 172 W. With an overall efficiency of 42%, the mechanical power requirement is 39 W (Table I). This yielded a muscle efficiency of 23%, which is slightly smaller than the maximum muscle efficiency of 25% in mechanical power production as reported in the literature. This indicated that the majority of the power generation is from muscles doing positive work. Interestingly, under the mechanical engagement condition (3) where no electricity was generated, the mechanical power requirement was 33 W and this was associated with a net metabolic cost of 103 W. If all the mechanical work is performed by positive muscle work, the metabolic cost should be 132 W. Therefore, there must be a portion of the mechanical work that was performed by the muscles as negative work. Considering that the muscles perform positive work with a maximum efficiency of 20% and negative work at −120% efficiency, the following equation can be used to find the amount of negative mechanical work, $P_{neg}$, performed by the muscles $$(33 - P_{neg}) \cdot 4 - \frac{P_{neg}}{1.2} = 103 \text{ W} \quad (16)$$

By solving this equation, the negative work is about a quarter of the total mechanical work, i.e., 9 W. Comparing the metabolic results of the mechanical engagement (3) and electrical engagement (4) modes, it was found that the additional mechanical power required to generate electricity elevated the metabolic cost significantly. This indicates that under some conditions the apparatus may impose a mechanical resistance upon the user. If the mechanical resistance exceeds the amount naturally produced by the user's muscles (the muscles produce a force to slow the limb down during swing), the user must perforin work to overcome the resistance. This additional work increases the metabolic cost of generating power from captured limb motion.

TABLE I

SUMMARY OF MECHANICAL POWER AND ELECTRICAL POWER

|  |  | 10 Ohm | 14 Ohm | 18 Ohm | 22 Ohm | Open |
|---|---|---|---|---|---|---|
| Electrical Power (W) | Mean | 19.28 | 15.26 | 13.93 | 12.19 | — |
|  | SD | 2.68 | 3.16 | 1.51 | 1.78 | — |
| Mechanical Power (W) | Mean | 49.73 | 39.34 | 38.39 | 36.68 | 33.37 |
|  | SD | 14.97 | 9.88 | 9.41 | 8.28 | 10.00 |
| Efficiency (%) | Mean | 48.4 | 42.4 | 38.1 | 34.4 | — | n = 5; SD: standard deviation

TABLE II

SUMMARY OF METABOLIC DATA.

|  |  | Quiet standing | Normal walking | Weighted walking | Mechanical engagement | Electrical engagement |
|---|---|---|---|---|---|---|
| Gross Power (W) | Mean | 112.9 | 298.12 | 315.55 | 418.95 | 487.39 |
|  | SD | 22.01 | 26.77 | 32.75 | 34.11 | 51.09 |
| Net Power (W) | Mean | — | 185.22 | 202.65 | 306.05 | 374.49 |
|  | SD | — | 12.8 | 25.63 | 30.46 | 45.71 | n = 5; SD: standard deviation; net power was calculated by deducting cost of quiet standing Example 2

Figure 9:
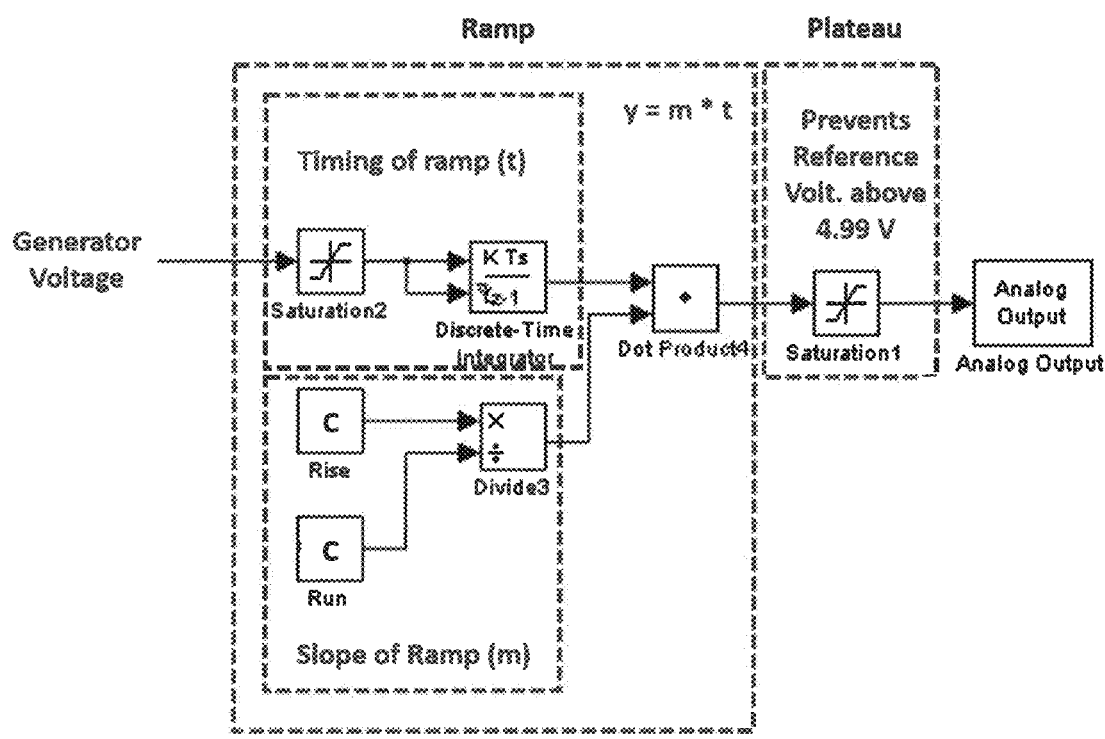
FIG. 9 is a block diagram of a timing-based sensorless adaptive control method, according to one embodiment.

A sensorless adaptive control embodiment was designed and implemented in MATLAB Simulink™ (The Math Works, Inc., Natick, Mass.). The simulation used a timing-based control method, shown in the block diagram of FIG. 9. The generator voltage was used as the signal to segment the power generation cycle into periods. After determining the power generation phases, the charging current load profile was implemented as including two segments, a ramp and a plateau. The ramp started at the start of the power generation cycle. In this example, the slope (m) was held constant, which was determined from experimental data. With the slope and the plateau, the duration of the ramp was determined.

The simulation included a comparison to a non-adaptive embodiment (under constant electrical load). Data collected from a treadmill walking trial was inputted into the model.

Figure 10:
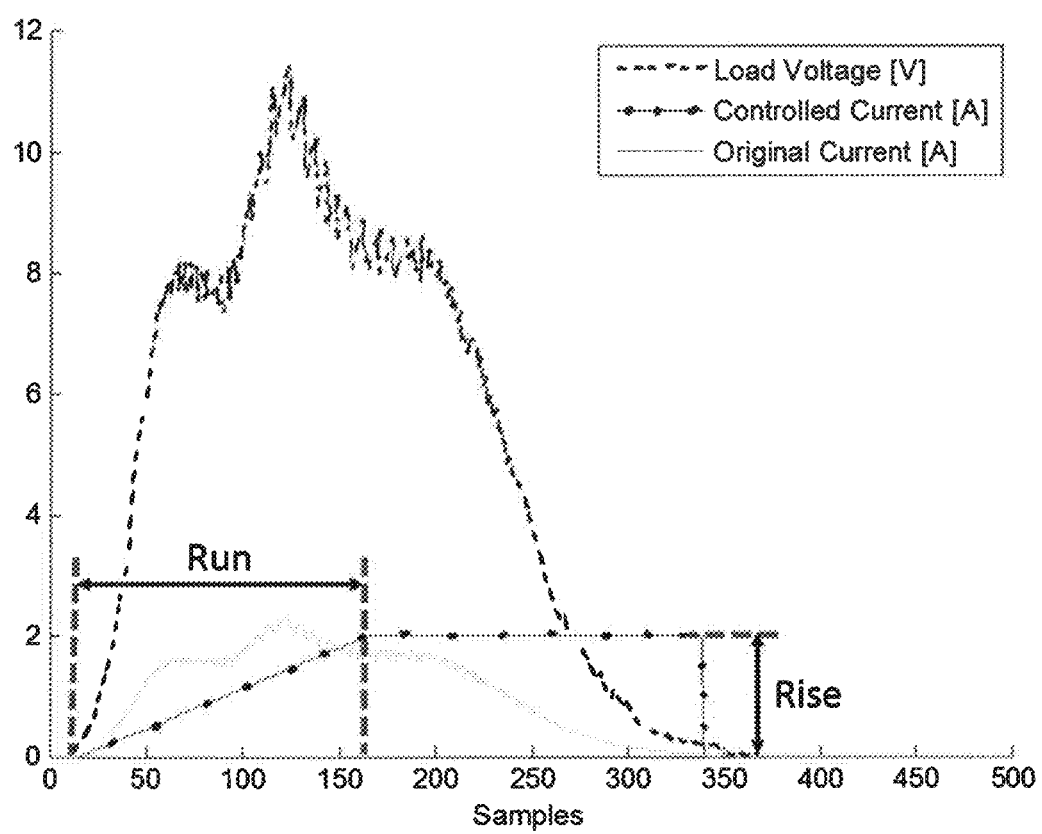
FIG. 10 is a plot showing results of a simulation for non-adaptive and adaptive embodiments with an electrical load of 5 ohms.

FIG. 10 shows results of the simulation for the non-adaptive and adaptive embodiments with an electrical load of 5 ohms. For the non-adaptive embodiment, current draw is larger during the first segment of the power generation cycle than with the timing-based adaptive control method. This confirmed that power generation creates resistance for the lower limb during the pre-swing period of the power generation cycle. As a result, the knee extensor muscles must perform more work to overcome the resistance, and therefore will cause an increase of user effort. In contrast, the timing-based adaptive control method implemented a sloped current profile, in which the current draw was smaller at the beginning of the power generation cycle and reached its maximum value when the second period of the power generation cycle started. Accordingly, power generation mostly assists the flexor muscles in performing negative braking work, which helps to reduce the user effort. To damp the inertial energy as quickly as possible, the current profile was maintained at a maximum value in the third period of power generation cycle. However, this does not affect user effort, as the device is separated from the user input due to uncoupling of the input pulleys and the generator.

All cited documents are incorporated herein by reference in their entirety.

EQUIVALENTS

While the invention has been described with respect to illustrative embodiments thereof, it will be understood that various changes may be made in the embodiments without departing from the scope of the invention. Accordingly, the described embodiments are to be considered merely exemplary and the invention is not to be limited thereby.

The invention claimed is:

1. Apparatus for generating electrical power from a user's limb motion, comprising;
    a motion capture apparatus that is adapted to capture at least a portion of the motion of each limb of a pair of limbs of the user;
    a motion integrator mechanically coupled to the motion capture apparatus that produces a single output motion from the captured motion of each limb of the pair of limbs;
    an electrical generator mechanically coupled to the single output motion of the motion integrator; and
    a controller that varies an electrical load of the electrical generator according to the motion of the pair of limbs of the user;
    wherein the electrical generator generates electrical power from the single output motion of the motion integrator.

2. The apparatus of claim 1, wherein the motion capture apparatus comprises:
    (i) a first anchor that is adapted to removably attach to a first limb of the user;
        a first actuator that converts motion of the first limb to a first rotational motion; and
        a first link connected between the first anchor and the first actuator that transfers motion of the first limb to the first actuator; and
    (ii) a second anchor that is adapted to removably attach to a second limb of the user;
        a second actuator that converts motion of the second limb to a second rotational motion; and
        a second link connected between the second anchor and the second actuator that transfers motion of the second limb to the second actuator.

3. The apparatus of claim 2, wherein the first link and the second link each comprise one or more of:
    a cable, a brace, or a rod, or a combination thereof;
    a take-up spring, and
    a pulley and a one-way clutch.

4. The apparatus of claim 1, further comprising one or more sensors that sense the motion of the user's limbs and/or an input force on the motion capture apparatus, and output one or more corresponding sensor signals;
    wherein the controller varies the electrical load of the electrical generator according to the one or more sensor signals.

5. The apparatus of claim 1, wherein the controller varies the electrical load of the electrical generator according to a model that is used to determine different periods of a power generation cycle of the user's limb motion.

6. The apparatus of claim 2, wherein the motion integrator comprises:
    a first input for receiving the first rotational motion of the first actuator;
    a second input for receiving the second rotational motion of the second actuator; and
    an output that provides the single output motion;
    wherein the single output motion is unidirectional rotational motion.

7. The apparatus of claim 1, wherein the motion of a first limb and the motion of a second limb are substantially reciprocal.

8. The apparatus of claim 1, further comprising one or more electrical components electrically coupled to an electrical output of the generator, for one or more of receiving, conditioning, and distributing the electrical power.

9. The apparatus of claim 1, wherein the motion capture apparatus is adapted to capture at least a portion of the motion of a pair of legs of the user.

10. The apparatus of claim 1, wherein the motion capture apparatus is adapted to capture at least a portion of the motion of a pair of legs of a human being.

11. The apparatus of claim 1, wherein at least a portion of the apparatus is adapted to fit to the user's torso.

12. The apparatus of claim 1, wherein at least a portion of the apparatus is adapted to fit to the user's back.

13. The apparatus of claim 11 wherein at least a portion of the apparatus is adapted to fit into a backpack.

14. The apparatus of claim 11, wherein the apparatus comprises a backpack.

15. A method for generating electrical power from a user's limb motion, comprising;
  adapting a motion capture apparatus to capture at least a portion of the motion of each limb of a pair of limbs of the user;
  mechanically coupling a motion integrator to the motion capture apparatus such that the motion integrator produces a single output motion from the captured motion of each limb of the pair of limbs;
  mechanically coupling an electrical generator to the single output motion of the motion integrator; and
  varying an electrical load of the electrical generator according to the motion of the pair of limbs of the user;
  wherein the electrical generator generates electrical power from the single output motion of the motion integrator.

16. The method of claim 15, comprising providing a motion capture apparatus that includes:
  (i) a first anchor that is adapted to removably attach to a first limb of the user,
    a first actuator that converts motion of the first limb to a first rotational motion; and
    a first link connected between the first anchor and the first actuator that transfers motion of the first limb to the first actuator, and
  (ii) a second anchor that is adapted to removably attach to a second limb of the user;
    a second actuator that converts motion of the second limb to a second rotational motion; and
    a second link connected between the second anchor and the second actuator that transfers motion of the second limb to the second actuator.

17. The method of claim 15, comprising using a motion integrator that:
  receives captured motion of a first limb;
  receives captured motion of a second limb; and
  outputs motion derived from a combination of the captured motions of the first and second limbs.

18. The method of claim 17, wherein the motion of the first limb and the motion of the second limb are substantially reciprocal.

19. The method of claim 15, comprising sensing an input force on the motion capture apparatus; and
  varying the electrical load of the electrical generator according to the sensed motion of the user's limbs and/or input force on the motion capture apparatus.

20. The method of claim 15, comprising varying the electrical load of the electrical generator according to a model that is used to determine different periods of a power generation cycle of the user's limb motion.

21. The method of claim 17, further comprising electrically coupling one or more electrical components to an electrical output of the generator, for one or more of receiving, conditioning, and distributing the electrical power.

22. The method of claim 15, further comprising adapting mechanical and electrical components to be carried on the user's back.

23. The method of claim 15, further comprising adapting mechanical and electrical components to be carried in a backpack.

* * * * *